US012738642B2

(12) United States Patent
Buduson et al.

(10) Patent No.: US 12,738,642 B2
(45) Date of Patent: Sep. 15, 2026

(54) VEHICLE WITH A RADIO FREQUENCY DEVICE AND ASSOCIATED METHODS

(71) Applicant: HARRIS GLOBAL COMMUNICATIONS, INC., Albany, NY (US)

(72) Inventors: James Buduson, North Chili, NY (US); Joseph D. Majkowski, Pittsford, NY (US); Peter Burke, Hilton, NY (US); James J. Hood, Victor, NY (US)

(73) Assignee: HARRIS GLOBAL COMMUNICATIONS, INC., Albany, NY (US)

( * ) Notice: Subject to any disclaimer, the term of this patent is extended or adjusted under 35 U.S.C. 154(b) by 420 days.

(21) Appl. No.: 18/460,988

(22) Filed: Sep. 5, 2023

(65) Prior Publication Data

US 2025/0079699 A1 Mar. 6, 2025

(51) Int. Cl.
*H01Q 3/26* (2006.01)
*H01Q 1/32* (2006.01)
*H01Q 3/02* (2006.01)

(52) U.S. Cl.
CPC ............. *H01Q 3/2611* (2013.01); *H01Q 3/02* (2013.01); *H01Q 1/32* (2013.01)

(58) Field of Classification Search
CPC ........... H01Q 3/2611; H01Q 3/02; H01Q 1/32
See application file for complete search history.

(56) References Cited

U.S. PATENT DOCUMENTS 4,298,873 A 11/1981 Roberts
5,107,273 A 4/1992 Roberts
6,175,326 B1 1/2001 Kare
6,704,557 B1 3/2004 Krishnamurthy et al.
7,408,898 B1 * 8/2008 Brown ............... H04B 7/18515 370/328
7,616,150 B1 11/2009 Woodell
8,983,420 B2 3/2015 Musselman
9,952,307 B2 4/2018 Gan
10,014,892 B1 * 7/2018 Leyh ................... H04B 17/345
10,211,531 B2 2/2019 Galejs
11,791,873 B1 * 10/2023 Chopra ................ H04B 7/0456 375/267

(Continued)

FOREIGN PATENT DOCUMENTS

| | | |
|---|---|---|
| DE | 4110774 | 10/1992 |
| JP | 7040569 | 3/2022 |

OTHER PUBLICATIONS

Signals Research Group, the LTE Standard, Apr. 2014, pp. 1-32.

(Continued)

*Primary Examiner* — Nazra Nur Waheed

(74) *Attorney, Agent, or Firm* — ALLEN, DYER, DOPPELT, + GILCHRIST, P.A.

(57) ABSTRACT

A vehicle may comprise a frame, a propulsion arrangement configured to orient the frame, and an antenna carried by the frame. The antenna may include a housing, a base carried by the housing, a pair of spaced apart antenna elements carried by the base, and a phase shifter coupled to the pair of antenna elements to define an antenna pattern having a pair of opposing nulls. An RF receiver is coupled to the antenna. A controller may control the propulsion arrangement to orient the frame to steer the antenna pattern based upon the RF receiver.

27 Claims, 8 Drawing Sheets

(56) References Cited

U.S. PATENT DOCUMENTS

| | | | | |
|---|---|---|---|---|
| 12,069,487 | B1 * | 8/2024 | Nobbe | H04W 16/28 |
| 2015/0340759 | A1 | 11/2015 | Bridgelall et al. | |
| 2017/0302006 | A1 * | 10/2017 | Lavin | H01Q 3/30 |
| 2020/0412426 | A1 | 12/2020 | Nilsson | |
| 2022/0255223 | A1 * | 8/2022 | Tran | H01Q 1/44 |
| 2022/0263240 | A1 | 8/2022 | Leather et al. | |

OTHER PUBLICATIONS

R.T. Compton "The Power-Inversion Adaptive Array: Concept and Performance" IEEE Transactions on Aerospace and Electronic Systems ( vol. AES-15, Issue: 6, Nov. 1979) pp. 803-814; Abstract Only.

U.S. Appl. No. 18/460,951, filed Sep. 5, 2023 Buduson et al.

* cited by examiner

VEHICLE WITH A RADIO FREQUENCY DEVICE AND ASSOCIATED METHODS

TECHNICAL FIELD

The present disclosure relates to vehicles, and, more particularly, to an RF device carried by a remotely controlled unmanned vehicle and associated methods.

BACKGROUND

Remotely controlled unmanned vehicles include airborne, land and water vehicles. Unmanned airborne vehicles (UAVs) are commonly referred to as drones. An operator uses radio frequency (RF) signals to remotely control an unmanned vehicle. In some cases, the unmanned vehicle may have reduced signal reception due to its operating environment.

Reduced signal reception may be caused by an RF interference source within the operating environment of the unmanned vehicle. The RF interference source may be intentional or unintentional.

Intentional RF interference may be from an RF jammer, for example. In this case, the RF jammer operates within the same frequency band as an RF receiver being carried by the unmanned vehicle. Unintentional RF interference may be from RF transmitters operating in close proximity to the unmanned vehicle.

There is a need to operate unmanned vehicles in the presence of an RF interference source. If RF signal reception at the RF device is degraded too much due to the RF interference source, then an operator of the unmanned vehicle may lose control.

SUMMARY

A vehicle may comprise a frame, a propulsion arrangement configured to orient the frame, and an antenna carried by the frame. The antenna may include a housing, a base carried by the housing, a pair of spaced apart antenna elements carried by the base, and a phase shifter coupled to the pair of antenna elements to define an antenna pattern having a pair of opposing nulls. An RF receiver is coupled to the antenna. A controller may control the propulsion arrangement to orient the frame to steer the antenna pattern based upon the RF receiver. The vehicle may be unmanned.

The pair of opposing nulls in the antenna pattern may be 180 degrees apart. The RF receiver operates over a frequency range, and the pair of opposing nulls may be aligned over the frequency range.

The phase shifter may include at least one discrete component. In another embodiment, the phase shifter may include a pair of feeds coupled to respective antenna elements in a reverse configuration.

The controller may orient the frame to steer the antenna pattern so that one of the nulls is directed toward an RF interference source. The controller may also orients the frame to steer the antenna pattern based upon received signal strength.

A spacing between the pair of antenna elements may be in a range of 0.1-0.7 wavelength of an operating frequency of the RF receiver. The pair of antenna elements may comprise a pair of dipole antenna elements extending upwardly from the base. The RF receiver may comprise at least one of a frequency-hopping spread spectrum (FHSS) receiver, a direct sequence spread spectrum (DSSS) receiver, and an orthogonal frequency-division multiplexing (OFDM) receiver.

Another aspect is directed to a vehicle comprising a frame, a propulsion arrangement configured to orient the frame, and an antenna carried by the frame. The antenna may include a housing, a base carried by the housing, a pair of spaced apart dipole antenna elements carried by the base, and a phase shifter coupled to the pair of antenna elements to define an antenna pattern having a pair of opposing nulls. An RF receiver is coupled to the antenna. A controller is coupled to the RF receiver and may be configured to control the propulsion arrangement to orient the frame to rotate the antenna pattern while determining received signal strengths of received RF signals, and to stop rotation of the antenna pattern at a desired received signal strength.

Yet another aspect is directed to a method for operating a vehicle an RF device as described above. The method may include operating the RF receiver coupled to the antenna, and operating the controller to control the propulsion arrangement to orient the frame to steer the antenna pattern based upon the RF receiver.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notations may be used to indicate similar elements in different embodiments.

Figure 1:
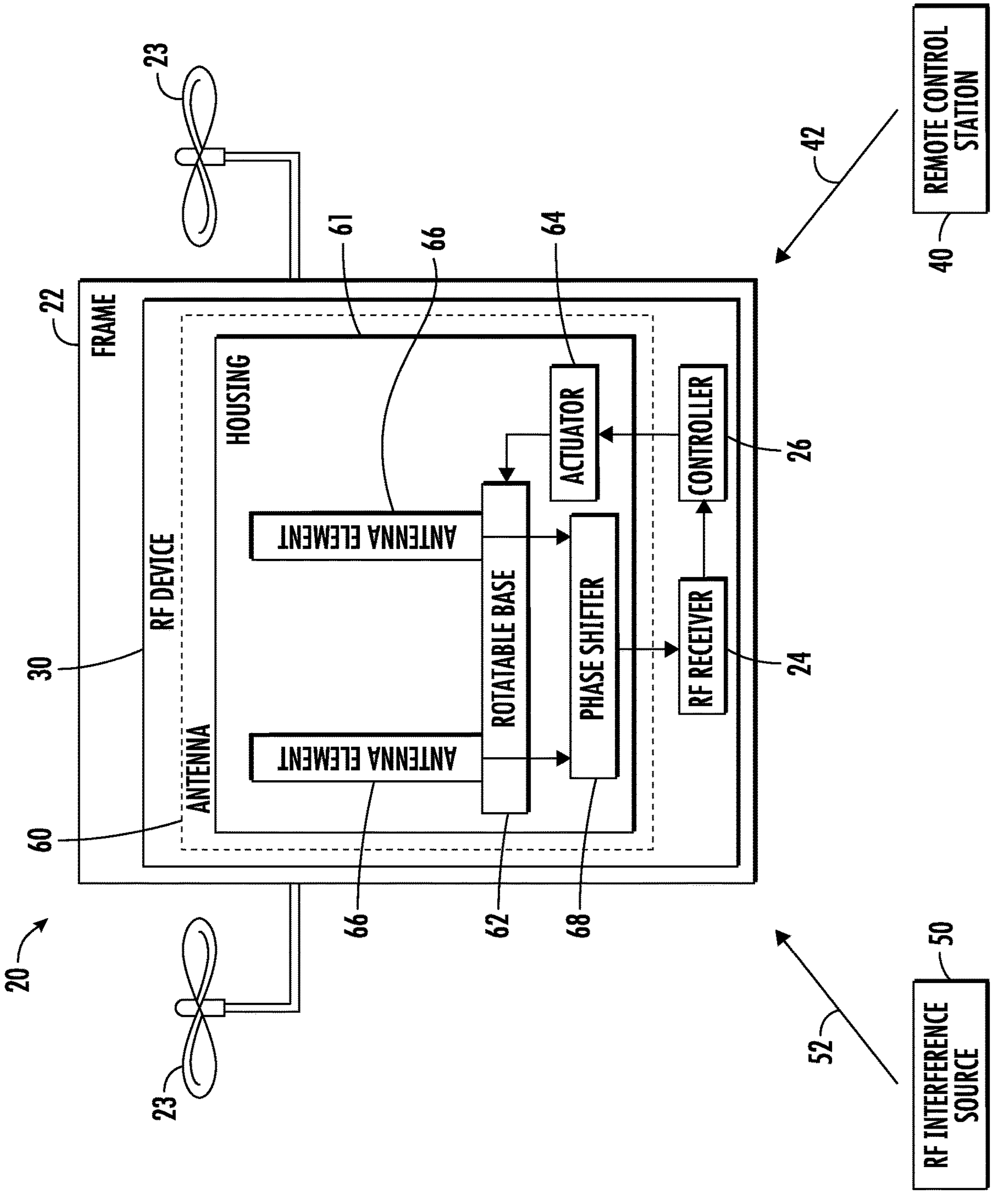
FIG. 1 is a schematic diagram of an RF device for a vehicle in which various aspects of the disclosure may be implemented.
Figure 3:
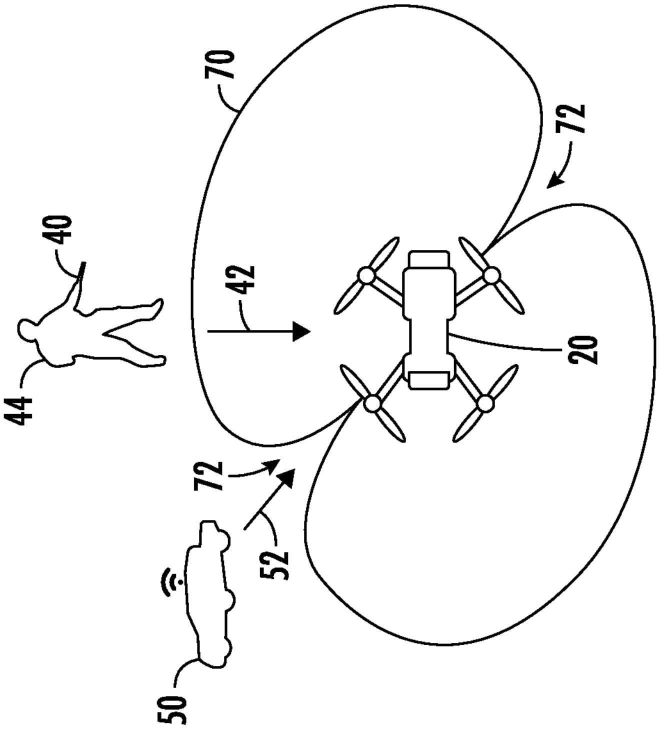
FIG. 3 is a top view of the vehicle illustrated in FIG. 2 being controlled by the operator in an environment that has an RF interference source.
Figure 2:
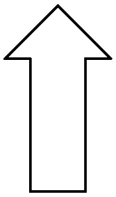
FIG. 2 is a top view of the vehicle illustrated in FIG. 1 being controlled by an operator in an environment that does not have an RF interference source.
Figure 2:
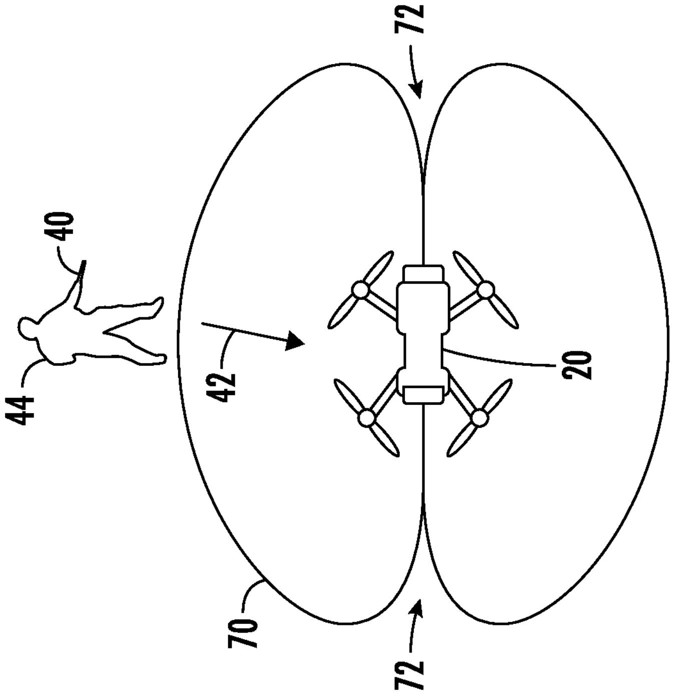

Referring initially to FIG. 1-3, a radio frequency (RF) device 30 for a vehicle 20 will be discussed. The vehicle 20 as shown is an unmanned aerial vehicle (UAV), which may also be referred to as a drone. The vehicle 20 includes a frame 22 carrying a propulsion arrangement 23 to provide lift and maneuverability. The propulsion arrangement 23 may be based on one or more propeller blades, for example. The vehicle 20 may operate in low-to-medium altitude airspace, such as up to 100 meters, for example. In other embodiments, the vehicle 20 may be configured to operate on land or the water.

Control of the vehicle 20 is based on the RF device 30 receiving RF control signals 42 from a remote control station 40 controlled by an operator 44. The RF device 30 needs to have good reception of the RF control signals 42 to ensure control of the vehicle 20. If an RF interference source 50 within the operating environment of the unmanned vehicle 20 is transmitting RF interference signals 52, then these signals may disrupt control of the vehicle 20. If control of the vehicle 20 is disrupted or lost, then the vehicle may not complete its intended goal or mission.

The RF device 30 includes an antenna 60, an RF receiver 24 and a controller 26. Although not shown, the RF device 30 may also include a transmitter to communicate with the remote control station 40. The antenna 60 includes a housing 61, a rotatable base 62 carried by the housing, an actuator 64 configured to selectively rotate the base, a pair of spaced apart antenna elements 66 carried by the rotatable base, and a phase shifter 68 coupled to the pair of antenna elements 66 to define an antenna pattern 70 having a pair of opposing nulls 72. The pair of opposing nulls 72 in the antenna pattern 70 may be 180 degrees apart.

The controller 26 is configured to drive the actuator 64 to steer the antenna pattern 70 based upon the RF receiver 24. RF signals received by the RF receiver 24 may be passed on to the controller 26 to determine received signal strength of the RF signals. The controller 26 may then steer the antenna pattern 70 based up the determined received signal strengths. For example, the controller may steer the antenna pattern 70 so that one of the nulls 72 is directed toward an RF interference source 50. This allows the antenna 60 to be resilient in the presence of an RF interference source 50 without changing orientation or a direction of travel of the vehicle 20.

The antenna elements 66 may be loop antennas, horn antennas, patch antennas, helical antennas, monopole antennas or dipole antennas, for example. For discussion purposes, the antenna elements 66 are configured as dipole antenna elements. Spacing between the antenna elements 66 is in a range of 0.1-0.7 wavelength of the operating frequency of the RF device 30. Typically, the wavelength is determined based on a highest operating frequency of the RF device 30.

The RF device 22 is not limited to a particular frequency band. The operating frequency may be within 0.3-3.0 GHz, for example. For discussion purposes, the dipole antenna elements 66 are sized to operate between 1.35-2.4 GHz. In this configuration, the dipole antenna elements 66 are about 5 inches in height with a spacing of about 2.5 inches therebetween. This corresponds to the antenna 60 having a height of about 6 inches and a diameter of about 3.5 inches, with a weight being less than 16 ounces. This allows the antenna 60 to be small, lightweight and low cost.

The antenna 60 operates as a linear array while the dipole antenna elements 66 are combined 180 degrees out of phase from one another. This causes the antenna pattern 70 to be circular-shaped with the pair of opposing nulls 72. In one embodiment, the phase shifter 68 includes at least one discrete component so that the dipole antenna elements 66 are combined 180 degrees out of phase from one another.

In another embodiment, the phase shifter 68 may include a pair of coaxial or stripline type feeds coupled to respective dipole antenna elements 66 in a reverse configuration so that the dipole antenna elements 66 are combined 180 degrees out of phase from one another. For the coaxial feeds, each coaxial cable has a center conductor and an outer conductor. The center and outer conductors of one of the coaxial cables for one of the dipole antenna elements is connected opposite of how the center and outer conductors of the other coaxial cable are connected to the other dipole antenna element.

As will be discussed below, the antenna 60 may also be configured to operate with one dipole antenna element 66 by switching out the other dipole antenna element 66. Operation with a single dipole antenna element 66 generates an omni-directional antenna pattern without any nulls. The omni-directional antenna pattern may be used when the signal strength of received RF signals is above a threshold. This typically indicates that the RF signals received by the RF receiver are not being degraded by an RF interference source 50.

If RF interference signals 52 from an RF interference source 50 are not being detected by the RF device 30, then the antenna pattern 70 may be positioned by the controller 26 so that the pair of nulls 72 is directed away from the operator 44, as shown in FIG. 2. However, if RF interference signals 52 are being detected by the RF device 30, then the antenna pattern 70 is positioned by the controller 26 so that one of the nulls 72 is directed towards the RF interference source 50, as shown in FIG. 3.

As the antenna pattern 70 is steered by the controller 26, orientation of the frame 22 via the propulsion arrangement 23 may remain the same. This allows the RF interference signals 52 to be mitigated without having to change a flight path of the vehicle 20.

Figure 4:
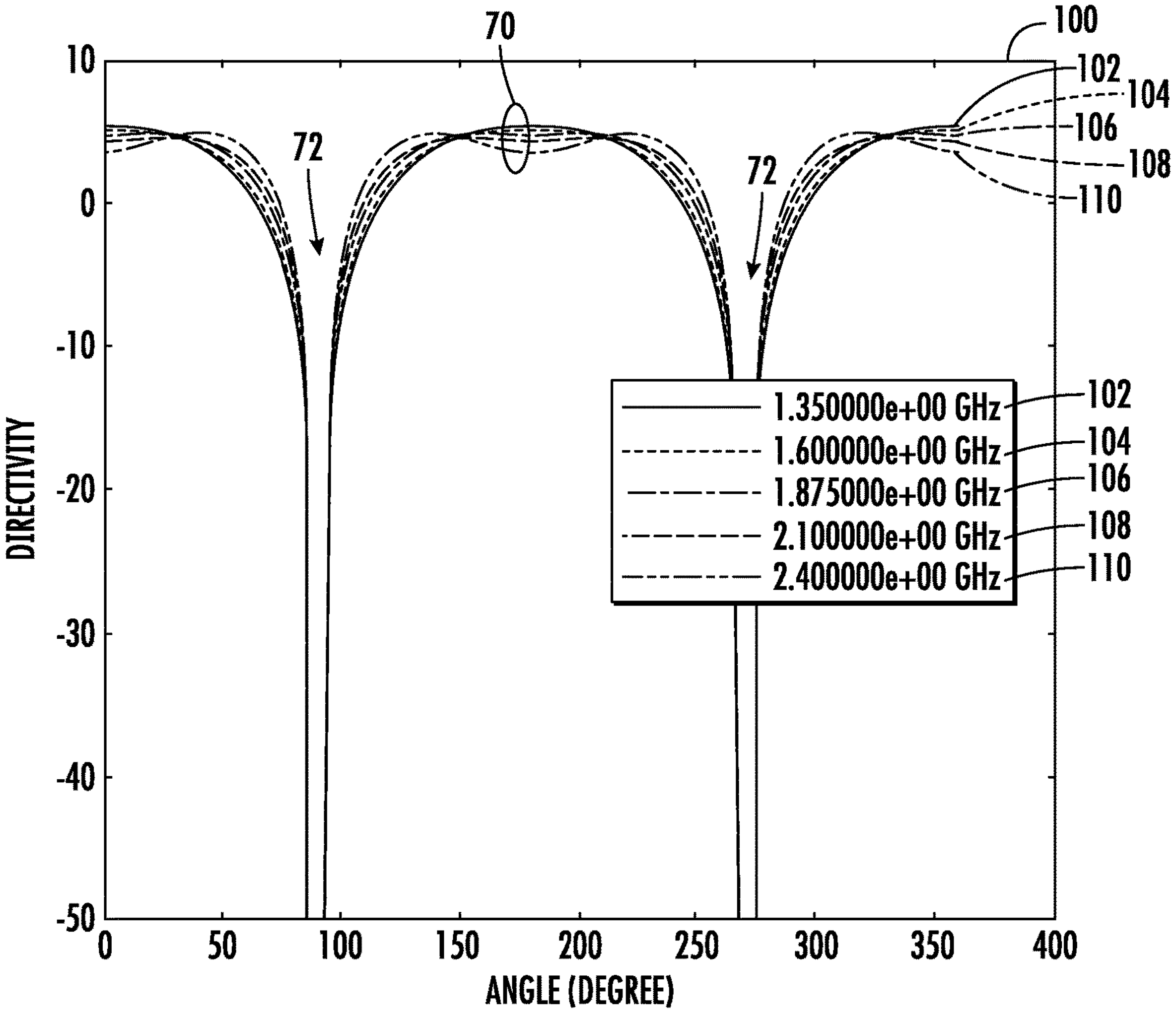
FIG. 4 is a graph of antenna patterns having nulls that remain aligned over a wide range of frequencies for the RF device illustrated in FIG. 1.

An advantage of the antenna 60 having a pattern 70 with a pair of opposing nulls 72 is that the nulls are aligned over an operating frequency range of the RF device 30, as shown by graph 100 in FIG. 4. This corresponds to the pair of antenna elements 66 being combined out-of-phase, as noted above. The operating frequency of the RF device 30 may vary between 1.35 GHz to 2.4 GHz, for example.

Line 102 corresponds to the antenna pattern 70 at 1.35 GHz, line 104 corresponds to the antenna pattern 70 at 1.60 GHZ, line 106 corresponds to the antenna pattern 70 at to 1.875 GHZ, line 108 corresponds to the antenna pattern 70 at 2.10 GHZ, and line 110 corresponds to the antenna pattern 70 at 2.40 GHZ.

The respective antenna patterns 70 corresponding to lines 102-110 basically overlap one another. Consequently, the nulls 72 remain consistent or aligned across a wide frequency band. This allows the RF receiver 22 to receive fixed frequency or frequency hopping RF control signals 42 while mitigating interference from an RF interference source 50.

To provide further resiliency in the presence of an RF interference source 50, the RF receiver 24 may be a spread spectrum receiver, for example. In one embodiment, the RF receiver 24 may be a frequency-hopping spread spectrum (FHSS) receiver to receive RF control signals 42 that are spread over a wide range of frequencies using frequency hopping. In another embodiment, the RF receiver 24 may be a direct sequence spread spectrum (DSSS) receiver to receive RF control signals 42 that are spread over a wide range of frequencies using a code. In yet another embodiment, the RF receiver 24 may be an orthogonal frequency-division multiplexing (OFDM) receiver to receive RF control signals 42 that are based on closely spaced narrowband subchannel frequencies instead of a single wideband channel frequency.

Figure 5:
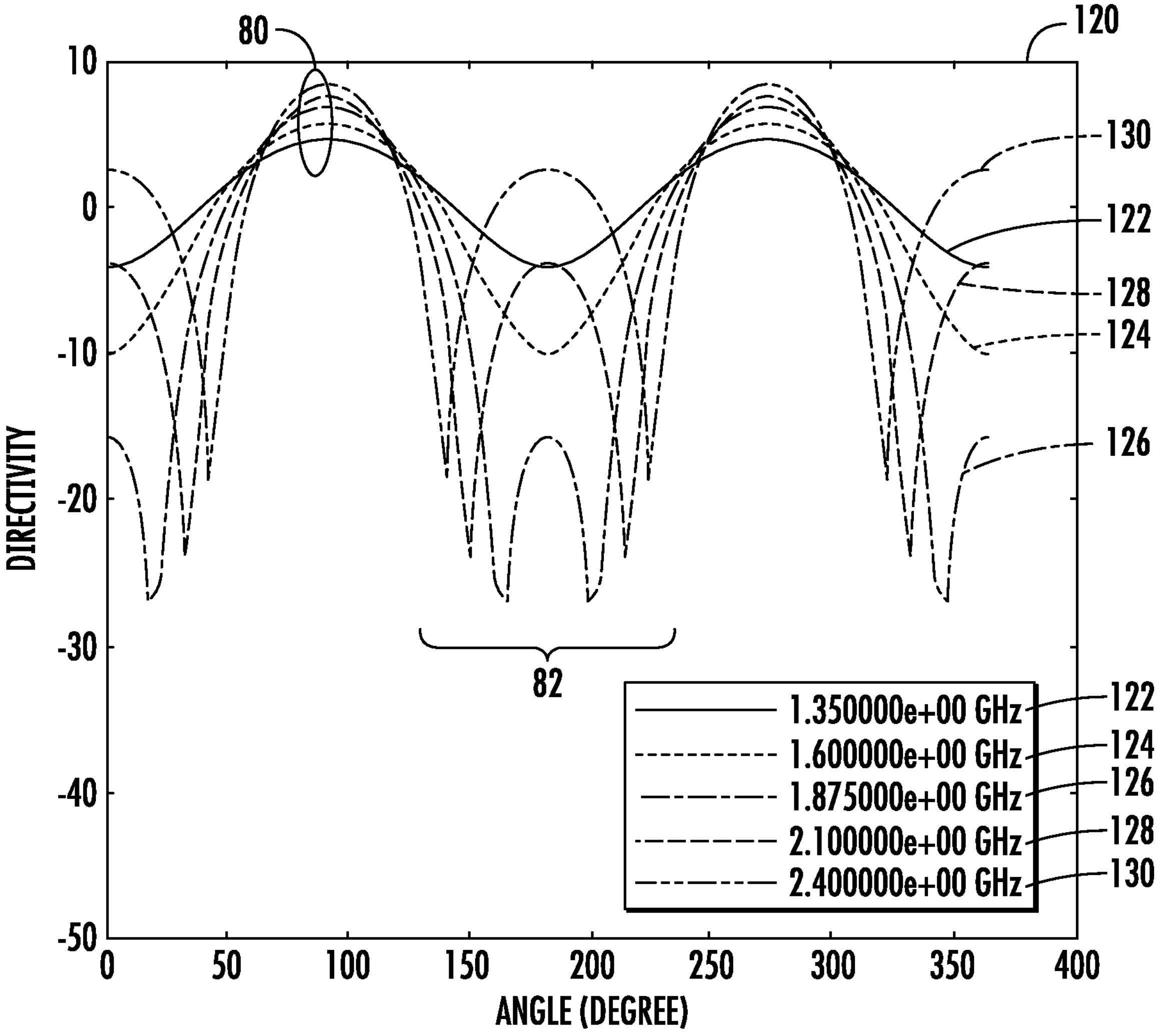
FIG. 5 is a graph of antenna patterns having nulls that move around over the same range of frequencies in FIG. 4.

For comparison purposes, reference is directed to graph 120 in FIG. 5 where the antenna patterns 80 have nulls 82 that do not remained aligned over the same frequency range of 1.35 GHz to 2.4 GHz. Instead, the nulls 82 move around based on a particular operating frequency. This corresponds to traditional beam steering where the dipole antenna elements 66 are not combined out-of-phase.

Line 122 corresponds to the antenna pattern 80 at 1.35 GHz, line 124 corresponds to the antenna pattern 80 at 1.60 GHZ, line 126 corresponds to the antenna pattern 80 at to 1.875 GHZ, line 128 corresponds to the antenna pattern 80 at 2.10 GHZ, and line 130 corresponds to the antenna pattern 80 at 2.40 GHZ.

With the nulls 82 changing at different frequencies, this makes it more difficult to operate with a frequency hopping or spread spectrum receiver. It would be difficult to point a null 82 of the antenna pattern 80 toward an RF interference source 50 at a particular frequency and then try to point the moving null 82 toward the RF interference source 50 at a different frequency.

Figure 6:
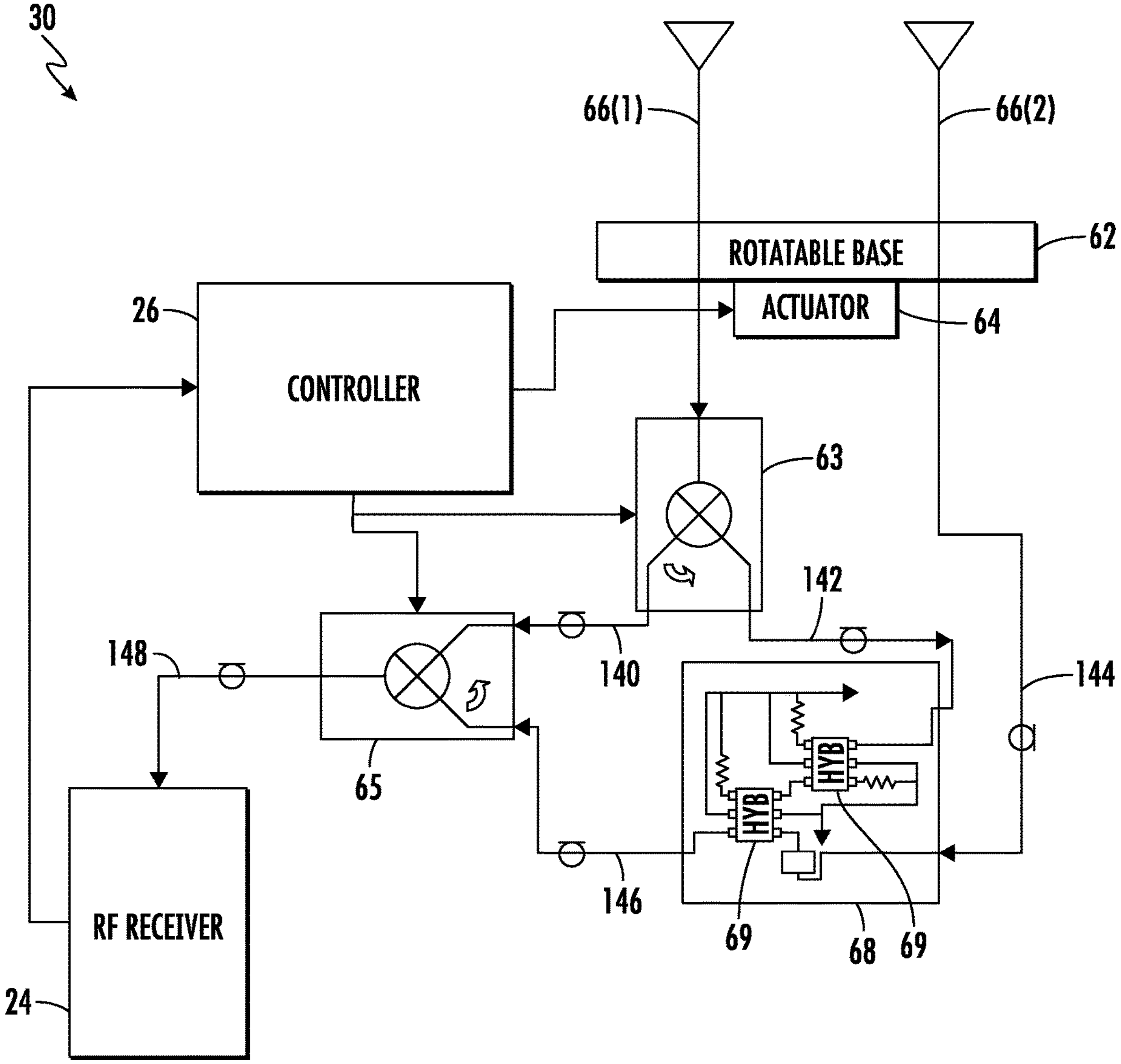
FIG. 6 is a more detailed schematic diagram of the RF device illustrated in FIG. 1.

Referring now to FIG. 6, a more detailed block diagram of the RF device 30 will be discussed. In particular, the RF device 30 includes a pair of RF switches 63 and 65 that are controlled by the controller 26. The RF switches 63, 65 are controlled so that the RF device 30 will operate with both of the dipole antenna elements 66(1), 66(2) or operate with just one of the dipole antenna elements 66(1).

Operation with a single dipole antenna element 66(1) generates an omni-directional antenna pattern without any nulls. The omni-directional antenna pattern may be used when the strength of received RF signals is above a threshold. In this case, RF switch 63 is switched so that coaxial cable 140 is connected to dipole antenna element 66(1). Consequently, coaxial cable 142 is not connected to dipole antenna element 66(1). RF switch 65 is switched so that coaxial cable 140 is connected with coaxial cable 148, which is connected to the RF receiver 24. Coaxial cable 146 from the phase shifter 68 is not connected to coaxial cable 148.

If the strength of received RF signals falls below a threshold, the controller 26 controls the RF switches 63, 65 so that the RF device 30 operates with both of the dipole antenna elements 66(1), 66(2). An RF interference source 50 may be causing the RF signals to fall below the threshold, for example.

The controller 26 controls RF switch 63 so that coaxial cable 142 is connected to dipole antenna element 66(1) instead of coaxial cable 140. The phase shifter 24 now receives RF signals from dipole antenna element 66(1). The phase shifter 24 also receives RF signals from dipole antenna element 66(2) via coaxial cable 144. The phase shifter 24 may include one or more discrete components, for example. The controller 26 controls RF switch 65 so that coaxial cable 146 is connected with coaxial cable 148, which is still connected to the RF receiver 24.

The controller 26 is connected to the RF receiver 24 to determine strength of the received RF signals. A value of the received signal strength may be determined as a signal-to-noise ratio (SNR) or as a received signal strength indicator (RSSI). Based on the strength of the received RF signals, the RF device 30 will control the RF switches 63, 65 accordingly.

Initial operation of the RF device 30 may be with dipole antenna element 66(1), for example. If the signal strength of the received RF signals drops below an initial threshold, then the controller 26 controls the RF switches 63, 65 so that the RF device 30 is operating with both of the dipole antenna elements 66(1), 66(2).

The controller 26 may then apply a control loop to mechanically sweep the antenna pattern 70 so that one of the nulls 72 maintains being directed towards the RF interference source 50 causing the initial threshold drop. The controller 26 may be a proportional derivative (PD) controller, for example. An output of the PD controller varies in proportion to the error signal as well as with the derivative of the error signal. An advantage of the PD controller is to increase the stability of steering one of the nulls 72 of the antenna pattern 70 toward an RF interference source 50 by improving control since it has the ability to predict future errors.

Another aspect is directed to a method for operating the RF device 30 for a vehicle 20 as described above. The RF device 30 includes an antenna 60 comprising a housing 61, a rotatable base 62 carried by the housing, an actuator 64 to selectively rotate the base, a pair of spaced apart antenna elements 66 carried by the rotatable base, and a phase shifter 68 coupled to the pair of antenna elements to define an antenna pattern 70 having a pair of opposing nulls 72. The method includes operating an RF receiver 24 coupled to the antenna 60, and operating a controller 26 to drive the actuator 64 to steer the antenna pattern 70 based upon RF signals received by the RF receiver 24.

Figure 7:
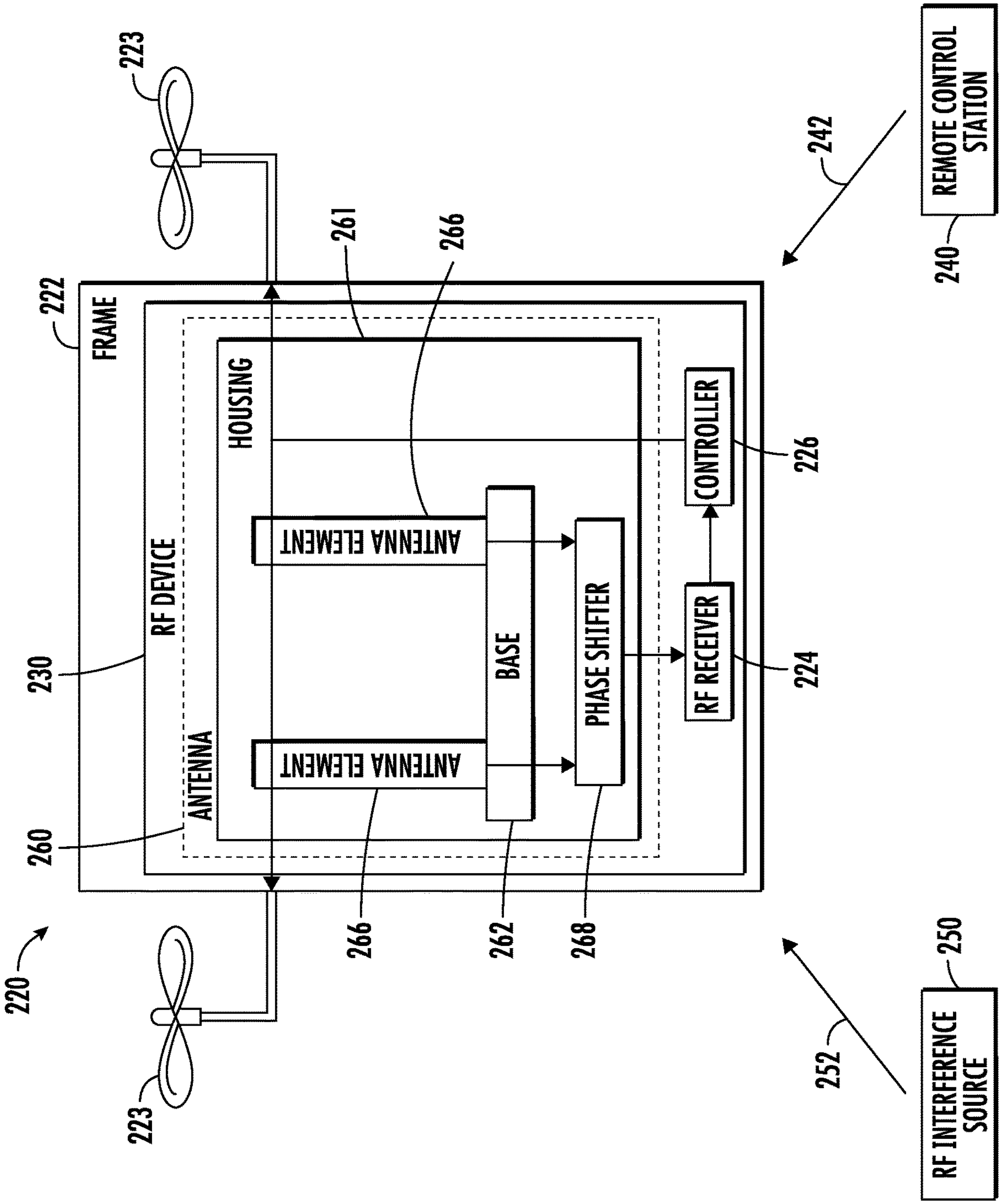
FIG. 7 is a schematic diagram of a vehicle with an RF device in which various aspects of the disclosure may be implemented.
Figure 9:
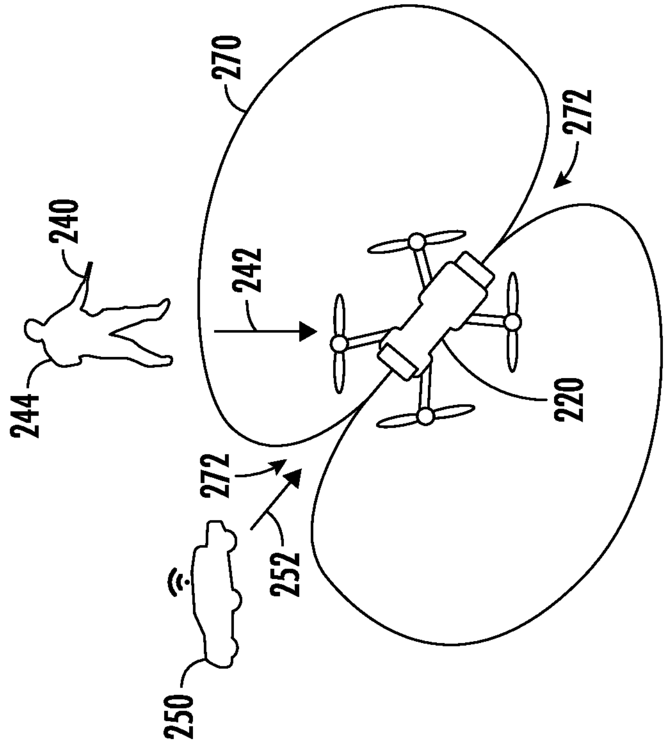
FIG. 9 is a top view of the vehicle illustrated in FIG. 7 being controlled by the operator in an environment that has an RF interference source.
Figure 8:
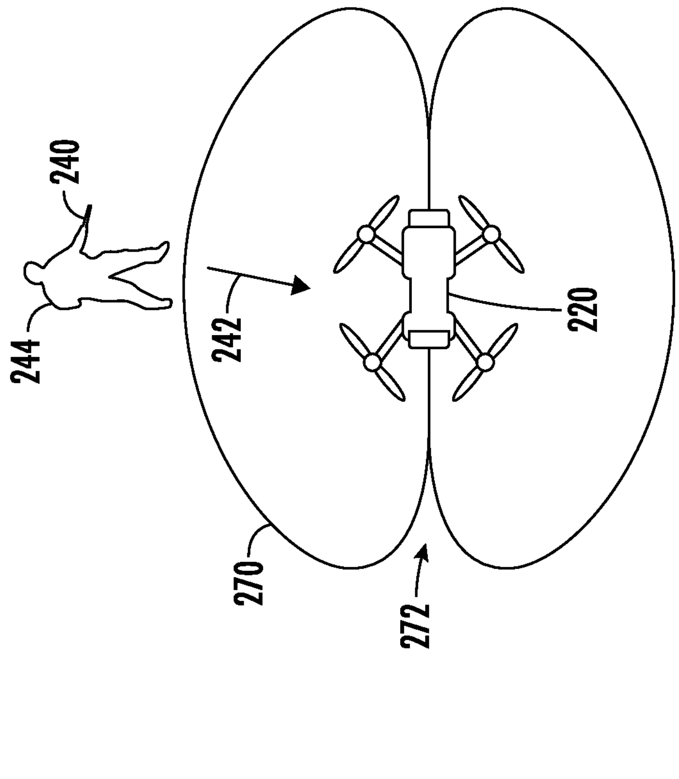
FIG. 8 is a top view of the vehicle illustrated in FIG. 7 being controlled by an operator in an environment that does not have an RF interference source.

Referring now to FIGS. 7-9, another aspect of the present description is directed to a vehicle 220 carrying a radio frequency (RF) device 230. The vehicle 220 as shown is an unmanned aerial vehicle (UAV), which may also be referred to as a drone. Certain reference numbers as used above will also be used below but will be preceded by a 2 to refer to like elements.

The vehicle 220 includes a frame 222 carrying a propulsion arrangement 223 to provide lift and maneuverability and to orient the frame 222. The frame 222 may also be referred to as a chassis or fuselage. The propulsion arrangement 223 may be based on one or more propeller blades, for example. The vehicle 220 may operate in low-to-medium altitude airspace, such as up to 100 meters, for example.

Control of the vehicle 220 is based on the RF device 230 receiving RF control signals 242 from a remote control station 240 controlled by an operator 244. The RF device 230 needs to have good reception of the RF control signals 242 to ensure control of the vehicle 220. If an RF interference source 250 within the operating environment of the unmanned vehicle 220 is transmitting RF interference signals 252, then these signals may disrupt control of the vehicle 220. If control of the vehicle 220 is disrupted or lost, then the vehicle may not complete its intended goal or mission.

The RF device 230 includes an antenna 260, an RF receiver 224 and a controller 226. Although not shown, the RF device 230 may also include a transmitter to communicate with the remote control station 240. The antenna 260 includes a housing 261, a base 262 carried by the housing, a pair of spaced apart antenna elements 66 carried by the base, and a phase shifter 268 coupled to the pair of antenna elements 266 to define an antenna pattern 270 having a pair of opposing nulls 272. The pair of opposing nulls 272 in the antenna pattern 270 may be 180 degrees apart.

Controller 226 is configured to control the propulsion arrangement 223 to orient the frame 222 to steer the antenna pattern 270 based upon the RF receiver 224. RF signals received by the RF receiver 224 may be provided to the controller 226 to determine received signal strength of the RF signals. The controller 226 may then orient the frame 222 to steer the antenna pattern 270 based up the determined received signal strengths. For example, the controller 226 may orient the frame 222 to steer the antenna pattern 270 so that one of the nulls 272 is directed toward an RF interference source 250. This allows the antenna 260 to be resilient in the presence of an RF interference source 250 by changing orientation or a direction of travel of the vehicle 220.

The antenna elements 266 may be loop antennas, horn antennas, patch antennas, helical antennas, monopole antennas or dipole antennas, for example. For discussion purposes, the antenna elements 266 are configured as dipole antenna elements. Spacing between the antenna elements 266 is in a range of 0.1-0.7 wavelength of the operating frequency of the RF device 230. Typically, the wavelength is determined based on a highest operating frequency of the RF device 230.

The RF device 222 is not limited to a particular frequency band. The operating frequency may be within 0.3-3.0 GHz, for example. For discussion purposes, the dipole antenna elements 266 are sized to operate between 1.35-2.4 GHz. In this configuration, the dipole antenna elements 266 are about 5 inches in height with a spacing of about 2.5 inches therebetween. This corresponds to the antenna 260 having a height of about 6 inches and a diameter of about 3.5 inches, with a weight being less than 16 ounces. This allows the antenna 260 to be small, lightweight and low cost.

The antenna 260 operates as a linear array while the dipole antenna elements 266 are combined 180 degrees out of phase from one another. This causes the antenna pattern 270 to be circular-shaped with the pair of opposing nulls 272. In one embodiment, the phase shifter 268 includes at least one discrete component so that the dipole antenna elements 266 are combined 180 degrees out of phase from one another.

In another embodiment, the phase shifter 268 may include a pair of coaxial or stripline type feeds coupled to respective dipole antenna elements 266 in a reverse configuration so that the dipole antenna elements 266 are combined 180 degrees out of phase from one another. For the coaxial feeds, each coaxial cable has a center conductor and an outer conductor. The center and outer conductors of one of the coaxial cables for one of the dipole antenna elements is connected opposite of how the center and outer conductors of the other coaxial cable are connected to the other dipole antenna element.

As will be discussed below, the antenna 260 may also be configured to operate with one dipole antenna element 266 by switching out the other dipole antenna element 266. Operation with a single dipole antenna element 266 generates an omni-directional antenna pattern without any nulls. The omni-directional antenna pattern may be used when the signal strength of received RF signals is above a threshold. This typically indicates that the RF signals received by the RF receiver are not being degraded by an RF interference source 250.

If RF interference signals 252 from an RF interference source 250 are not being detected by the RF device 230, then the antenna pattern 270 may be positioned by orienting the frame 222 so that the pair of nulls 272 is directed away from the operator 244, as shown in FIG. 8. However, if RF interference signals 252 are being detected by the RF device 230, then the frame 222 is oriented so that one of the nulls 272 is directed towards the RF interference source 250, as shown in FIG. 9. This allows the RF interference signals 252 to be mitigated by changing orientation or a flight path of the vehicle 220.

Figure 10:
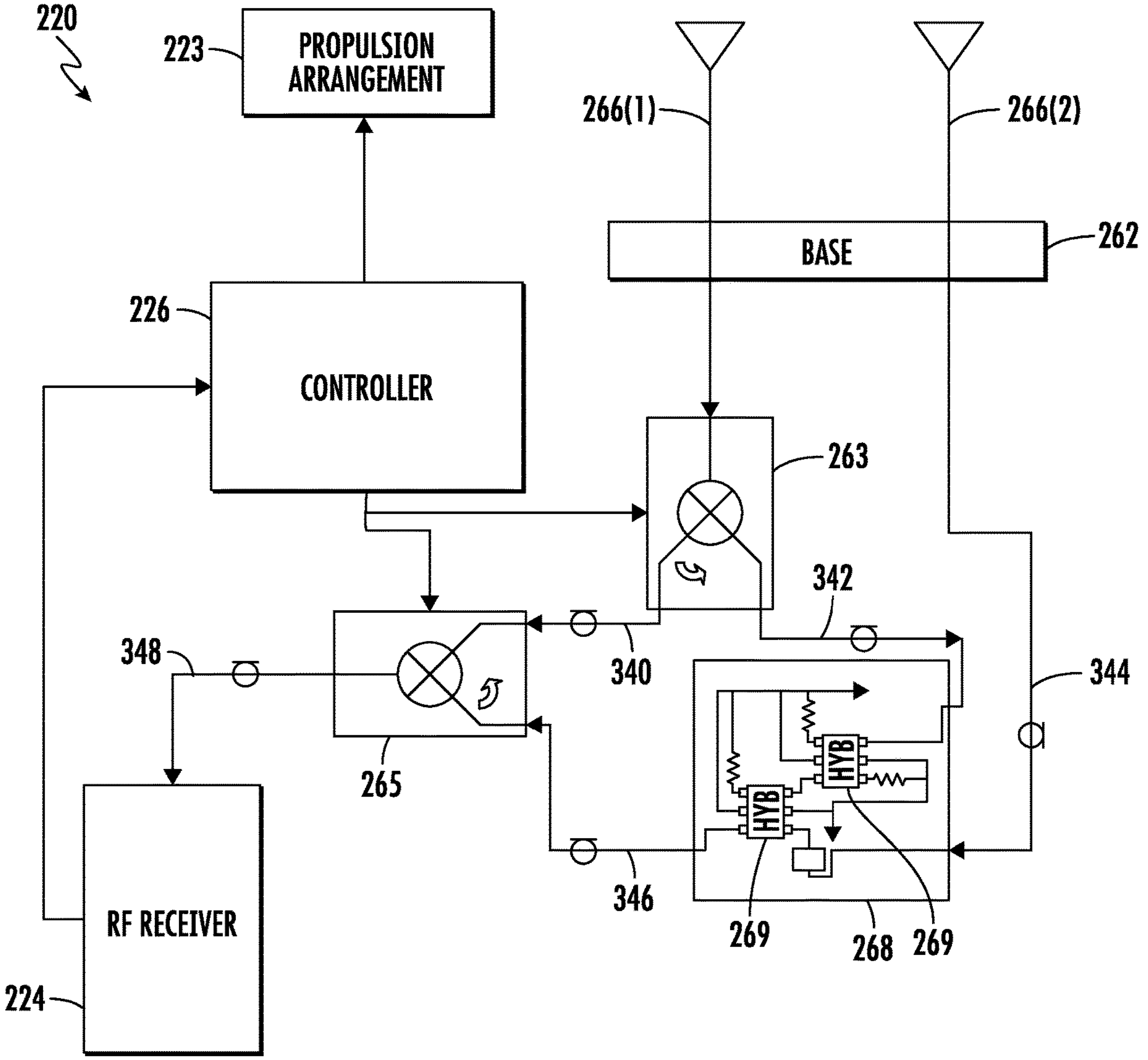
FIG. 10 is a more detailed schematic diagram of the vehicle illustrated in FIG. 7.

Referring now to FIG. 10, a more detailed block diagram of the vehicle 220 with the RF device 230 will be discussed. In particular, the RF device 230 includes a pair of RF switches 263 and 265 that are controlled by the controller 226. The RF switches 263, 265 are controlled so that the RF device 230 will operate with both of the dipole antenna elements 266(1), 266(2) or operate with just one of the dipole antenna elements 266(1).

Operation with a single dipole antenna element 266(1) generates an omni-directional antenna pattern without any nulls. The omni-directional antenna pattern may be used when the strength of received RF signals is above a threshold. In this case, RF switch 263 is switched so that coaxial cable 340 is connected to dipole antenna element 266(1). Consequently, coaxial cable 342 is not connected to dipole antenna element 266(1). RF switch 265 is switched so that coaxial cable 240 is connected with coaxial cable 248, which is connected to the RF receiver 224. Coaxial cable 346 from the phase shifter 268 is not connected to coaxial cable 348.

If the strength of received RF signals falls below a threshold, the controller 226 controls the RF switches 263, 265 so that the RF device 230 operates with both of the dipole antenna elements 266(1), 266(2). An RF interference source 250 may be causing the RF signals to fall below the threshold, for example.

The controller 226 controls RF switch 263 so that coaxial cable 342 is connected to dipole antenna element 266(1) instead of coaxial cable 340. The phase shifter 224 now receives RF signals from dipole antenna element 266(1). The phase shifter 224 also receives RF signals from dipole antenna element 266(2) via coaxial cable 344. The phase shifter 224 may include one or more discrete components, for example. The controller 226 controls RF switch 265 so that coaxial cable 346 is connected with coaxial cable 348, which is still connected to the RF receiver 224.

The controller 226 is connected to the RF receiver 224 to determine strength of the received RF signals. A value of the received signal strength may be determined as a signal-to-noise ratio (SNR) or as a received signal strength indicator (RSSI). Based on the strength of the received RF signals, the RF device 230 will control the RF switches 263, 265 accordingly.

Initial operation of the RF device 230 may be with dipole antenna element 266(1), for example. If the signal strength of the received RF signals drops below an initial threshold, then the controller 226 controls the RF switches 263, 265 so that the RF device 230 is operating with both of the dipole antenna elements 266(1), 266(2).

The controller 226 may then apply a control loop to orient the frame 222 to steer the antenna pattern 270 so that one of the nulls 272 maintains being directed towards the RF interference source 250 causing the initial threshold drop. The controller 226 may be a proportional derivative (PD) controller, for example. An output of the PD controller varies in proportion to the error signal as well as with the derivative of the error signal. An advantage of the PD controller is to increase the stability of orienting the frame 222 to steer one of the nulls 272 of the antenna pattern 270 toward an RF interference source 250 by improving control since it has the ability to predict future errors.

Another aspect is directed to a method for operating a vehicle 220 with a radio frequency (RF) device 230 as described above. The RF device 230 includes an antenna 260 comprising a housing 261, a base 262 carried by the housing, a pair of spaced apart dipole antenna elements 266 extending upwardly from the base, and a phase shifter 268 coupled to the pair of antenna elements 266 to define an antenna pattern 270 having a pair of opposing nulls 272. The method includes operating an RF receiver 224 coupled to the antenna 261, and operating a controller 226 to control the propulsion arrangement 223 to orient the frame 222 to steer the antenna pattern 270 based upon the RF receiver 224.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A vehicle comprising:

a frame;

a propulsion arrangement configured to orient the frame;

an antenna carried by the frame and comprising a housing, a base carried by the housing, a pair of spaced apart antenna elements arranged in a linear array, each antenna element comprising an elongate omni-directional antenna element having a proximal end coupled to the base and a distal end extending outwardly from the base, and a phase shifter coupled to the pair of antenna elements to define an antenna pattern having a pair of opposing nulls;

an RF receiver coupled to the antenna; and a controller configured to control the propulsion arrangement to orient the frame to steer the antenna pattern based upon the RF receiver, and configured to selectively operate a first one of the pair of spaced apart antenna elements while selectively switching out a second one of the pair of spaced apart antenna elements based upon a received signal strength being above a threshold.

2. The vehicle of claim 1 wherein the pair of opposing nulls in the antenna pattern are 180 degrees apart.

3. The vehicle of claim 1 wherein the RF receiver operates over a frequency range, and the pair of opposing nulls are aligned over the frequency range.

4. The vehicle of claim 1 wherein the controller orients the frame to steer the antenna pattern so that one of the nulls is directed toward an RF interference source.

5. The vehicle of claim 1 wherein the phase shifter comprises at least one discrete component.

6. The vehicle of claim 1 wherein the phase shifter comprises a pair of feeds coupled to respective antenna elements in a reverse polarity configuration.

7. The vehicle of claim 1 wherein the controller orients the frame to steer the antenna pattern based upon received signal strength.

8. The vehicle of claim 1 wherein a spacing between the pair of antenna elements is in a range of 0.1-0.7 wavelength of an operating frequency of the RF receiver.

9. The vehicle of claim 1 wherein each elongate, omni-directional antenna element comprises a dipole antenna element.

10. The vehicle of claim 1 wherein the RF receiver comprises at least one of a frequency-hopping spread spectrum (FHSS) receiver, a direct sequence spread spectrum (DSSS) receiver, and an orthogonal frequency-division multiplexing (OFDM) receiver.

11. The vehicle of claim 1 wherein the vehicle is unmanned.

12. A vehicle comprising:

a frame;

a propulsion arrangement configured to orient the frame;

an antenna carried by the frame and comprising a housing, a base carried by the housing, a pair of spaced apart elongate, dipole antenna elements arranged in a linear array, each elongate, dipole antenna element having a proximal end coupled to the base and a distal end extending outwardly from the base, and a phase shifter coupled to the pair of antenna elements to define an antenna pattern having a pair of opposing nulls;

an RF receiver coupled to the antenna; and a controller coupled to the RF receiver and configured to control the propulsion arrangement to orient the frame to rotate the antenna pattern while determining received signal strengths of received RF signals, configured to stop rotation of the antenna pattern at a desired received signal strength, and configured to selectively operate a first one of the pair of spaced apart elongate, dipole antenna elements while selectively switching out a second one of the pair of spaced apart elongate, dipole antenna elements based upon a received signal strength being above a threshold.

13. The vehicle of claim 12 wherein the pair of opposing nulls in the antenna pattern are 180 degrees apart.

14. The vehicle of claim 12 wherein the RF receiver operates over a frequency range, and the pair of opposing nulls are aligned over the frequency range.

15. The vehicle of claim 12 wherein the controller orients the frame to steer the antenna pattern so that one of the nulls is directed toward an RF interference source.

16. The vehicle of claim 12 wherein a spacing between the pair of antenna elements is in a range of 0.1-0.7 wavelength of an operating frequency of the RF receiver.

17. The vehicle of claim 12 wherein the RF receiver comprises at least one of a frequency-hopping spread spectrum (FHSS) receiver, a direct sequence spread spectrum (DSSS) receiver, and an orthogonal frequency-division multiplexing (OFDM) receiver.

18. The vehicle of claim 12 wherein the vehicle is unmanned.

19. A method for operating a vehicle with a radio frequency (RF) device, the RF device comprising an antenna comprising a housing, a base carried by the housing, a pair of spaced apart antenna elements arranged in a linear array, each antenna element comprising an elongate omni-directional antenna element having a proximal end coupled to the base and a distal end extending outwardly from the base, and a phase shifter coupled to the pair of antenna elements to define an antenna pattern having a pair of opposing nulls, the method comprising:

operating an RF receiver coupled to the antenna;

operating a controller to control the propulsion arrangement to orient the frame to steer the antenna pattern based upon the RF receiver, and to selectively operate a first one of the pair of spaced apart antenna elements while selectively switching out a second one of the pair of spaced apart antenna elements based upon a received signal strength being above a threshold.

20. The method of claim 19 wherein the pair of opposing nulls in the antenna pattern are 180 degrees apart.

21. The method of claim 19 wherein the RF receiver operates over a frequency range, and the pair of opposing nulls are aligned over the frequency range.

22. The method of claim 19 wherein the controller orients the frame to steer the antenna pattern so that one of the nulls is directed toward an RF interference source.

23. The method of claim 19 wherein the controller orients the frame to steer the antenna pattern based upon received signal strength.

24. The method of claim 19 wherein a spacing between the pair of antenna elements is in a range of 0.1-0.7 wavelength of an operating frequency of the RF receiver.

25. The method of claim 19 wherein each elongate, omni-directional antenna element comprises a dipole antenna element.

26. The method of claim 19 wherein the RF receiver comprises a frequency-hopping spread spectrum (FHSS) receiver.

27. The method of claim 19 wherein the vehicle is unmanned.

* * * * *